United States Patent
Fujita et al.

(10) Patent No.: US 7,789,222 B2
(45) Date of Patent: Sep. 7, 2010

(54) PROOFER

(75) Inventors: Kazuhide Fujita, Fujisawa (JP); Masayuki Koma, Fujisawa (JP); Koji Koike, Fujisawa (JP); Satoshi Goto, Kanagawa-ken (JP)

(73) Assignee: Oshikiri Machinery Ltd., Tokyo (JP)

( * ) Notice: Subject to any disclaimer, the term of this patent is extended or adjusted under 35 U.S.C. 154(b) by 15 days.

(21) Appl. No.: 12/030,427

(22) Filed: Feb. 13, 2008

(65) Prior Publication Data

US 2008/0199286 A1 Aug. 21, 2008

(30) Foreign Application Priority Data

Feb. 20, 2007 (JP) .............................. 2007-039989

(51) Int. Cl.
*B65G 17/16* (2006.01)
*B65G 17/18* (2006.01)
*B65G 17/32* (2006.01)
*B65G 43/00* (2006.01)
*B65G 23/44* (2006.01)

(52) U.S. Cl. .................... 198/867.1; 198/797; 198/798; 198/799; 198/802; 198/810.04; 198/814

(58) Field of Classification Search .................. 198/797, 198/798, 799, 802, 810.04, 814
See application file for complete search history.

(56) References Cited

U.S. PATENT DOCUMENTS

| 2,008,036 | A | * | 7/1935 | Pointon et al. | ................. 53/74 |
| 3,583,549 | A | * | 6/1971 | Hershey, Jr. | ............. 198/465.3 |
| 3,677,393 | A | * | 7/1972 | Temple | ........................ 198/795 |
| 3,804,583 | A | * | 4/1974 | Parkes | ......................... 432/230 |
| 5,720,990 | A | * | 2/1998 | Lawrence et al. | ........... 425/229 |
| 6,053,304 | A | * | 4/2000 | Biagiotti | ..................... 198/794 |

FOREIGN PATENT DOCUMENTS

JP 2006204221 A * 8/2006

* cited by examiner

*Primary Examiner*—Gene Crawford
*Assistant Examiner*—Yolanda Cumbess
(74) *Attorney, Agent, or Firm*—Brinks Hofer Gilson & Lione

(57) ABSTRACT

An endless dough conveyor 16 is provided with a resin endless toothed belt 18 instead of a metal chain. A toothed pulley 22 around which the endless toothed belt is wound is also made of resin. A rail 64 is disposed adjacent to a horizontal path of the belt, and a roller 46 attached to the belt is adapted to roll on the rail. At least two induction motors are provided for driving the endless toothed belt. The induction motors are supplied with electric power from a single inverter 35. At least a pulley is provided with a detecting unit 80. The detecting unit 80 detects a state in which teeth of the endless toothed belt climb onto that of the pulley, thereby predicting breakage of the belt. Thus, it is possible to prevent contamination of dough in a proofer.

4 Claims, 5 Drawing Sheets

[Fig. 1]
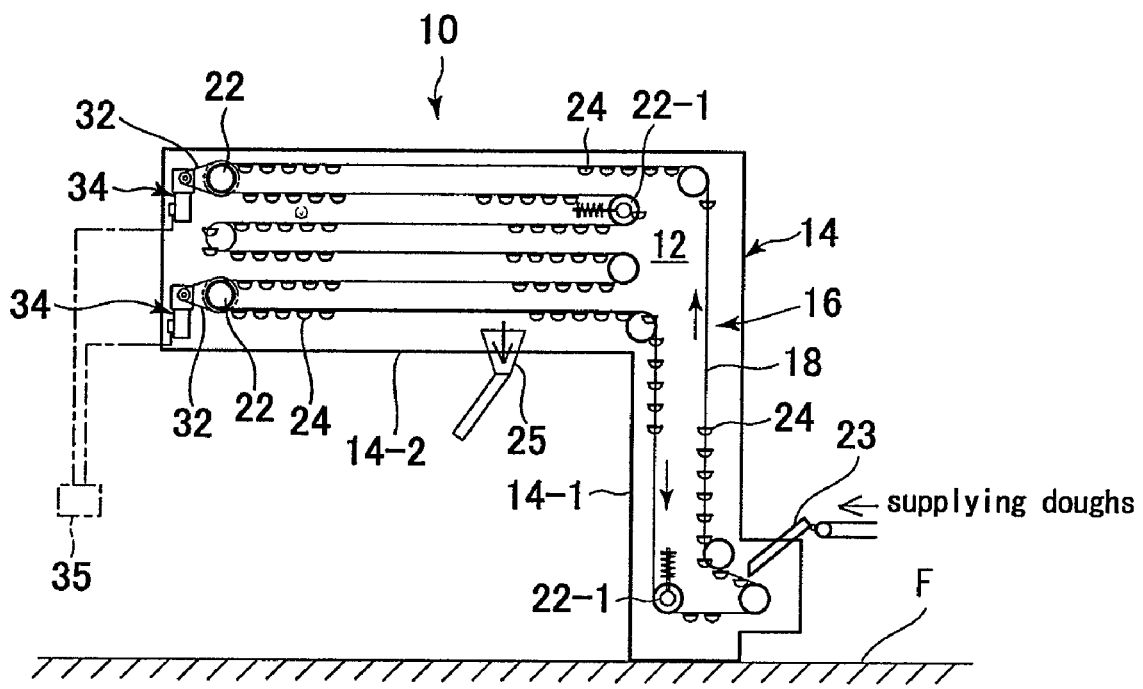

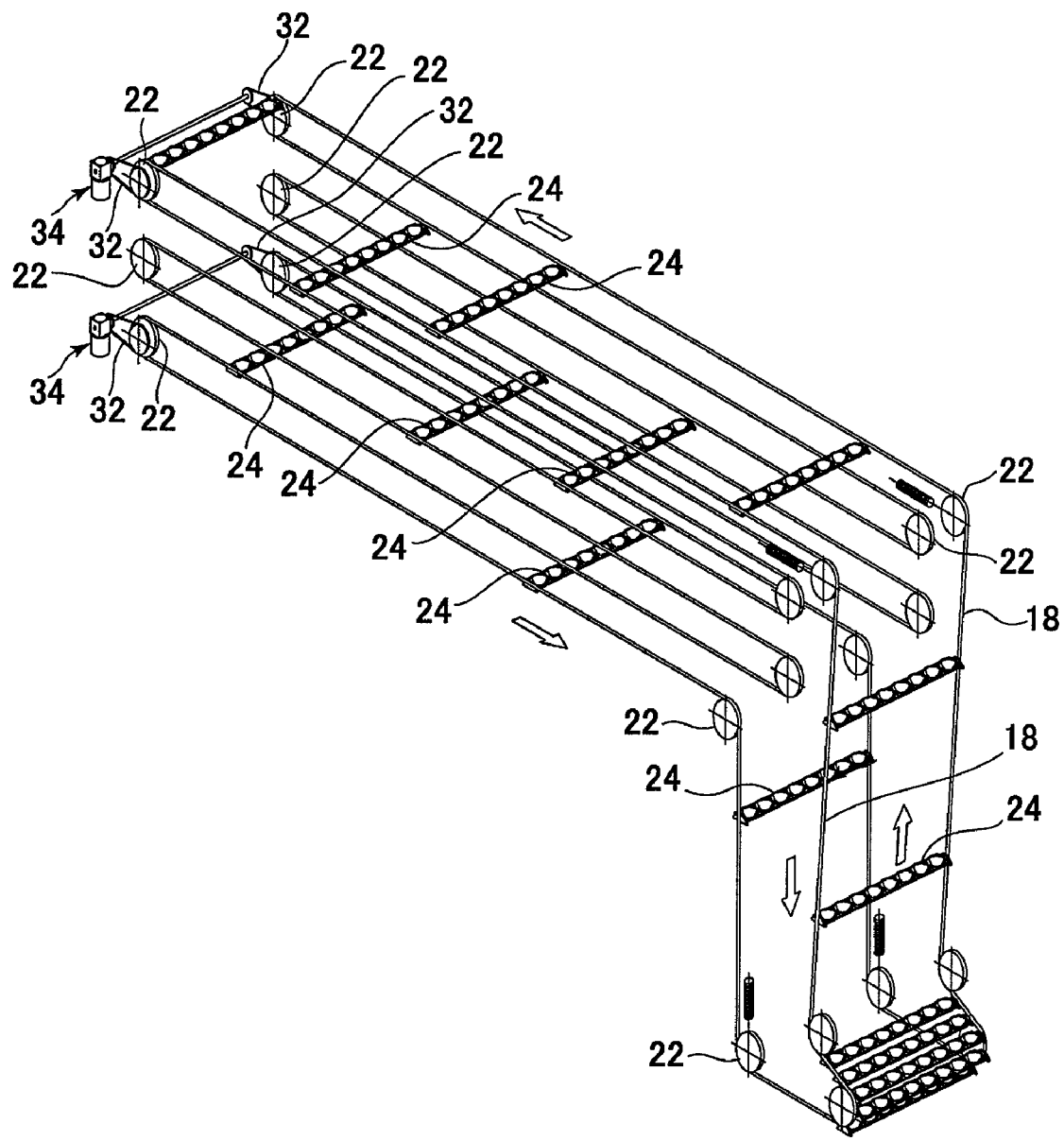
[Fig. 2]

[Fig. 3]
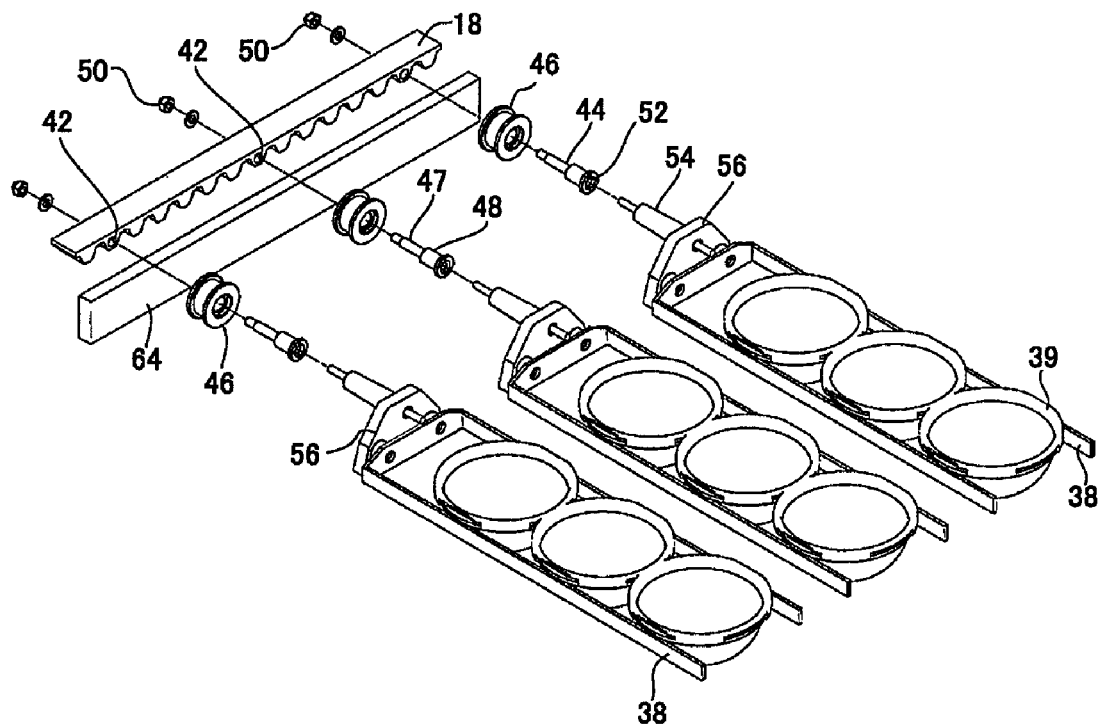
[Fig. 4]
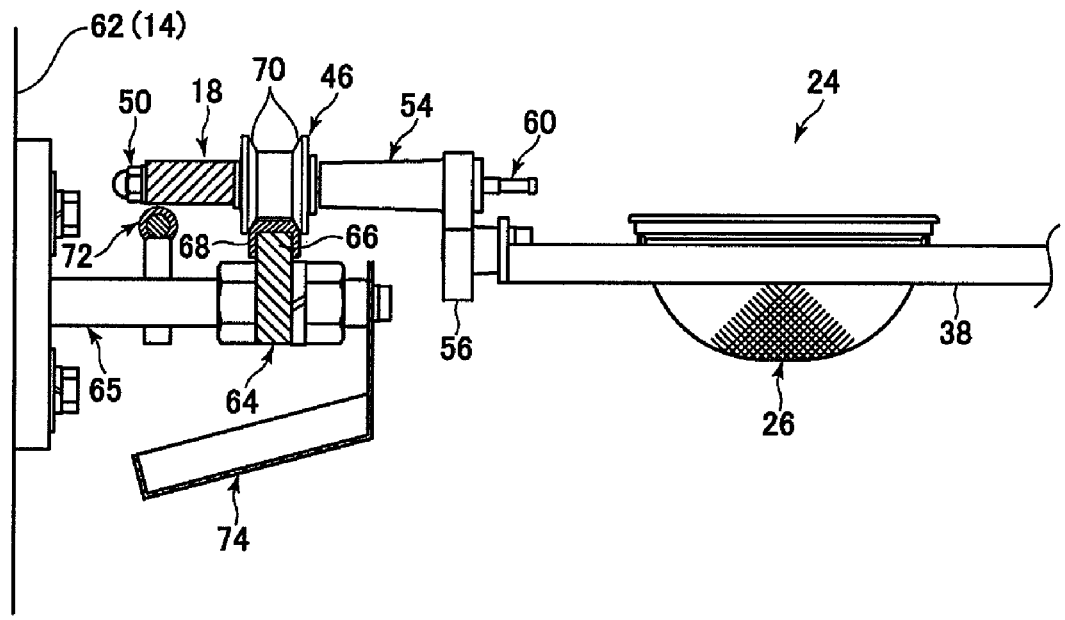

[Fig. 5]
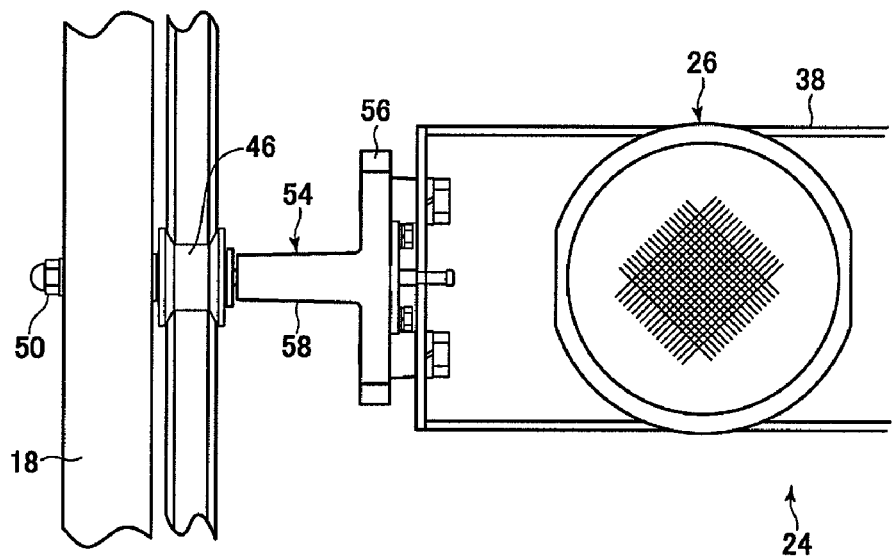
[Fig. 6]
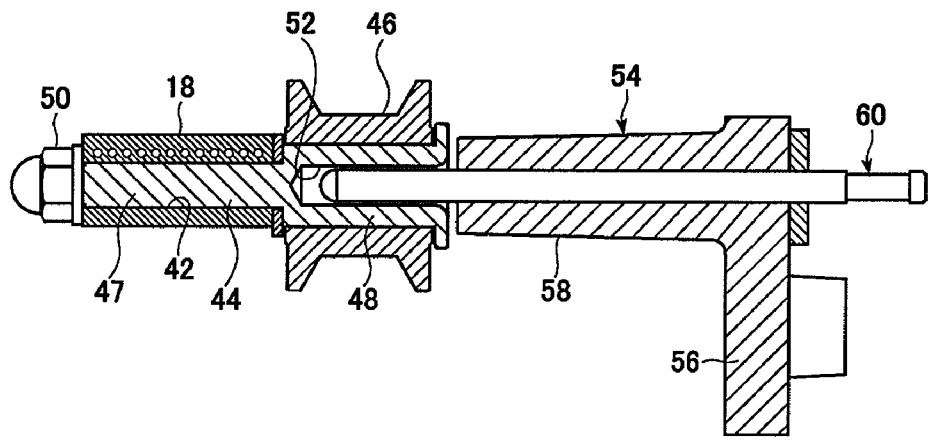
[Fig. 7]
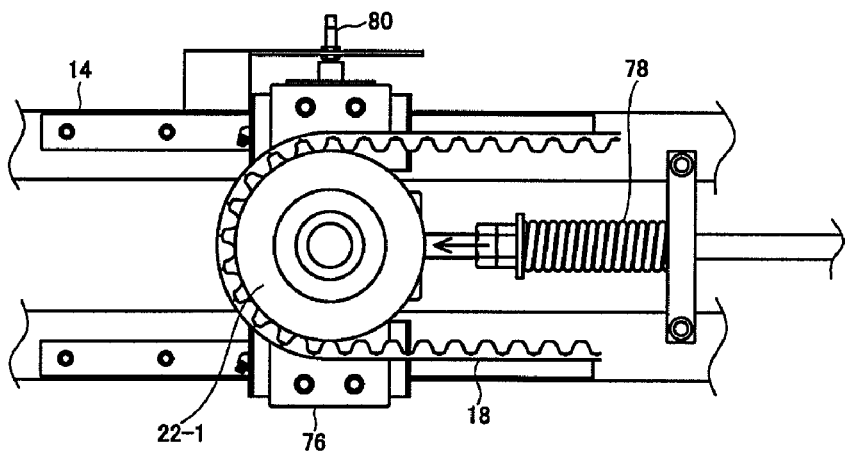

[Fig. 8]
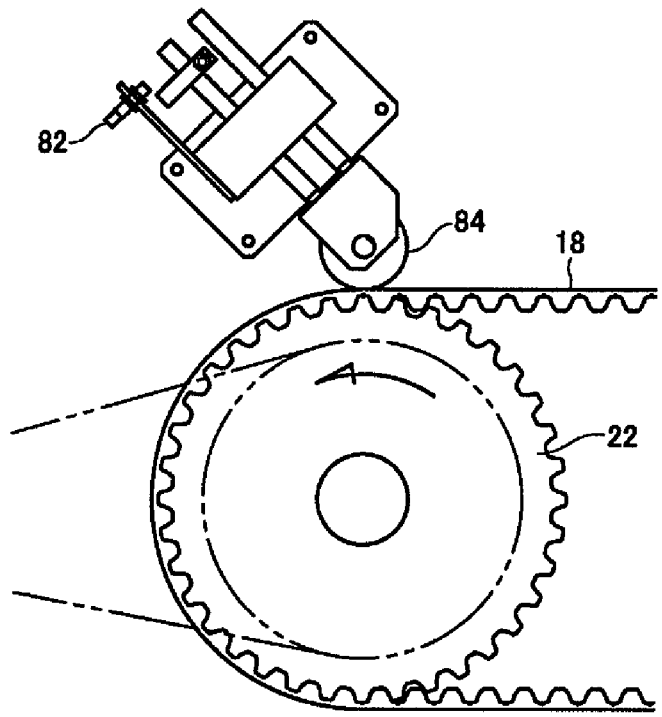
[Fig. 9]
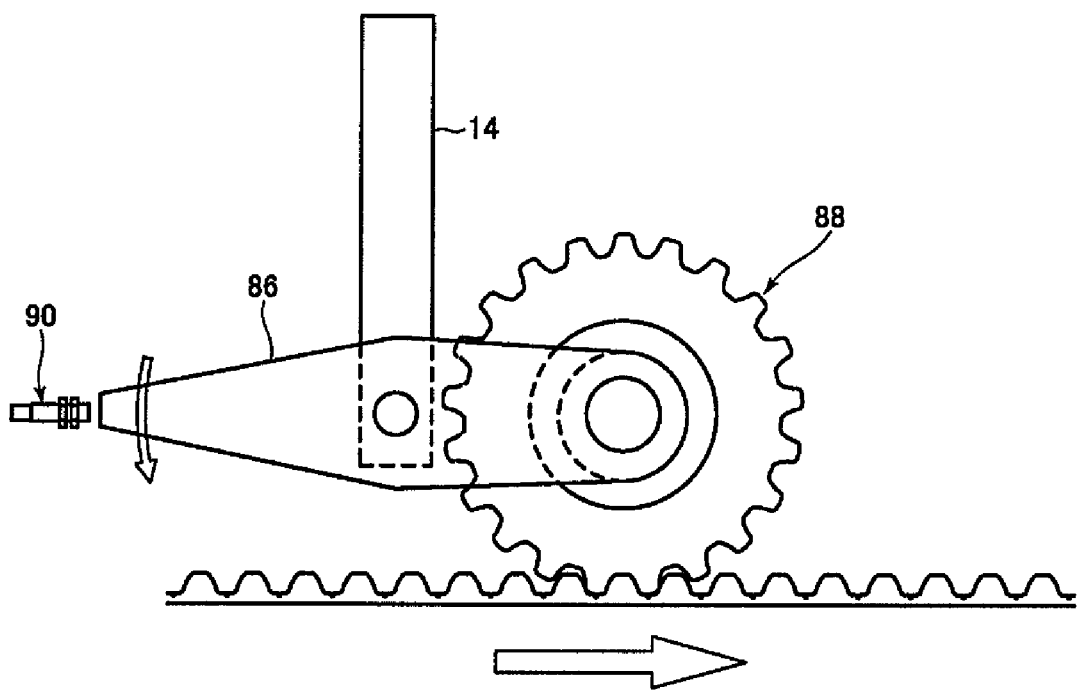

PROOFER

This application claims priority under 35 U.S.C. §119 to Japanese Patent application No. JP2007-039989 filed Feb. 20, 2007, the entire content of which is hereby incorporated by reference.

BACKGROUND OF THE INVENTION

1. Field of the Invention

The present invention relates to a proofer (a fermentation apparatus) used in a bread making process.

2. Description of the Related Art

In a bread making process, bread dough undergoes a series of dough forming processes such as dividing, rounding, fermentation, deflating, and panning, and then is baked. In order to promote fermentation and stabilize dough structure, divided and rounded dough pieces are placed on a conveyor and conveyed for a predetermined period of time in a proofer chamber in which temperature is kept constant.

A dough conveyor disposed in the proofer generally has a pair of metal endless chains spaced from and parallel to each other, and a plurality of dough holding members disposed between the pair of metal endless chains. The dough holding members are each provided with a basket on which dough is placed.

In such a conventional proofer, a metal chain is wound around and driven by a metal sprocket. Therefore, metal powders generated by the friction between the chain and the sprocket may be mixed into bread dough. Moreover, since the metal chain is lubricated, the lubricant may drip off, and powders floating in the proofer adhere to the metal chain and the metal sprocket. Then, the mixture of wear powders, lubricant, and bread dough flour may be separated from the chain and the sprocket and mixed into the bread dough.

It is an object of the present invention to solve the above problems in such a conventional proofer.

SUMMARY OF THE INVENTION

The present invention provides a proofer including a proofer chamber, and an endless dough conveyor at least a part of which is disposed in the proofer chamber. The endless dough conveyor includes a pair of resin endless toothed belts spaced a predetermined distance from each other in the horizontal direction, a resin toothed pulleys around which the resin endless toothed belts are engaged, a dough holding members disposed between and successively arranged along the pair of endless toothed belts so as to extend in a direction perpendicular to the direction in which dough is conveyed, a connecting members attached to the endless toothed belts for detachably connecting opposite ends of the respective each end of the dough holding members detachably to the endless toothed belt, resin rollers rotatably attached to the connecting members, and a pair of rails disposed along horizontal moving paths of the rollers which extend between the opposite ends of the dough holding members and the pair of resin endless toothed belts, respectively, for supporting the rollers moving along the horizontal moving paths.

In this proofer, the endless toothed belt and the toothed pulley are made of resin. Therefore, in contrast to a conventional proofer using a chain, metal powders are not generated or lubricant does not drip from the toothed belt and the toothed pulley, whereby it is possible to substantially reduce the possibility of contamination of bread dough.

Specifically, the connecting member is a metal shaft secured to the endless toothed belt and extending inwardly in a widthwise direction of the endless dough conveyor. The metal shaft has a connection hole extending outwardly in the widthwise direction from the inner end of the shaft. The roller is rotatably attached to the shaft to rotate about an axis of the shaft. The dough holding member has at each end thereof a connecting pin which is displaceable in the connection hole in the widthwise direction of the endless dough conveyor. The connecting pin is pushed outwardly in the widthwise direction to be inserted into the connection hole, whereby the dough holding member is connected to the connecting member.

More specifically, the rail may include a metal rail body and a roller engaging member made of resin and attached to the rail body so as to support the roller.

The roller may have at opposite ends thereof a flange each having an inclined surface. The inclined surfaces of the flanges extends in a diverging fashion from a surface of the roller. The roller engaging member of the rail may be configured to be engaged with the inclined surfaces of the flanges at a position away from the surface of the roller.

With this arrangement, the roller surely engages with the rail, whereby it is possible to stably move the endless toothed belt.

Further, the proofer may also include an assist rail which is disposed on the outer side of the rail and extends along the rail. The assist rail engages with and supports the endless toothed belt positioned on the outer side of the rail when the endless toothed belt is engaged with the toothed pulley in a state in which the dough holding member has not been connected to the connecting member.

When the endless dough conveyor is installed in the proofer, the left and right endless toothed belts are each wound around the corresponding toothed pulleys, and then the dough holding member is connected to the both endless toothed belts. In this state, it is possible to stably handle the endless toothed belts by means of the assist rails.

More specifically, the proofer may also include a frame disposed on both sides of the endless dough conveyor and having a cantilever shaft extending from the frame toward the endless dough conveyor. The toothed pulley is rotatably held by the cantilever shaft.

With this arrangement, if the dough holding members are removed from the endless toothed belts, there is no obstruction between the endless toothed belts, whereby a worker can enter the proofer to carry out cleaning and the like.

More specifically, the toothed pulleys are arranged to make a plurality of pairs of the toothed pulleys which are oppositely disposed on left and right sides of the endless dough conveyor and at least two pairs thereamong areare for driving. Each pair of the at least two pairs of the toothed pulleys is drivingly connected to an induction motor. The induction motors are supplied with driving electric power from a single inverter.

In this case, for example, the two induction motors, which are separately disposed, operate synchronously with each other, thereby sharing the load of driving the endless dough conveyor. Therefore, in comparison with a case in which a single motor is used, a driving force for each endless toothed belt (i.e., a tension of each endless toothed belt) can be half or less. With a plurality of motors, the total motor capacity for the endless dough conveyor can be large, while the tension acting on each belt can be smaller than an allowable tension of each belt. Therefore, although the allowable tension of each belt is smaller than that of each chain, it is possible to provide an equal conveying power which compares with that of the endless chain conveyor.

Further, the proofer may also de configured as follows. The toothed pulleys are arranged to make a plurality of pairs of the toothed pulleys which are oppositely disposed on left and right sides of the endless dough conveyor and at least one pair thereamong among the pairs of toothed pulleys disposed on the left and right sides of the endless dough conveyor so as to oppose to each other, at least a pair of toothed pulleys is a pair of take-up pulleys being displaceable according to the tension of the endless toothed belts. The proofer further includes an abnormal tension detecting sensor for detecting and indicating occurrence of abnormal tension on the endless toothed belts when the displacement of the at least one pair of the toothed pulleys is larger than a predetermined value.

Furthermore, the proofer may further include a detecting switch for detecting a risk of breakage of the endless toothed belt. If teeth of the endless toothed belt disengage with and climb onto that of the toothed pulley, the detecting switch detects this displacement of the endless toothed belt and indicates a risk of breakage of the endless toothed belt.

In comparison with the chain, the endless toothed belt has the above-described advantages. However, in a case where the endless toothed belt has broken at the end of its useful life, it takes time to replace the broken belt. Therefore, it is substantially important to predict such breakage of the endless toothed belt. Before the endless toothed belt breaks at the end of its useful life, the endless toothed belt is plastically stretched at a certain portion which will be broken, and then the distance between adjacent teeth at the certain portion becomes larger. In this plastically stretched portion, teeth of the endless toothed belt disengage with and climb onto that of the toothed pulley. The above detecting switch detects this displacement of the endless toothed belt, thereby predicting breakage of the endless toothed belt.

BRIEF DESCRIPTION OF THE DRAWINGS

FIG. 1 is a schematic diagram showing an inner structure of a proofer according to an embodiment of the present invention, as viewed from the front of the proofer.

FIG. 2 is a simplified perspective view of an endless dough conveyor in the proofer in FIG. 1.

FIG. 3 is a perspective view of one end portion of the endless dough conveyor in the proofer in FIG. 1.

FIG. 4 is a view of the one end portion as viewed in the conveying direction of the endless dough conveyor.

FIG. 5 is a top view of the one end portion.

FIG. 6 is a diagram showing the relationship between an endless toothed belt and a connecting member at the one end portion.

FIG. 7 is a diagram showing the relationship between a take-up pulley of the endless dough conveyor and a proximity switch which is disposed adjacent to the take-up pulley to detect abnormality of the endless toothed belt.

FIG. 8 is a view showing another detecting unit for detecting the abnormality of the endless toothed belt.

FIG. 9 is a view showing still another detecting unit for detecting the abnormality of the endless toothed belt.

DETAILED DESCRIPTION OF THE PREFERRED EMBODIMENTS

An embodiment of a proofer according to the present invention will now be described with reference to the accompanying drawings.

As in conventional proofers, a proofer 10 according to an embodiment of the present invention includes a housing 14 having a proofer chamber 12, and an endless dough conveyor 16 for receiving dough and conveying the dough in the chamber 12, as shown in FIG. 1, as a basic structure.

As shown in FIG. 2, the endless dough conveyor 16 has a pair of endless toothed belts 18 spaced a predetermined distance from and parallel to each other in the horizontal direction, a plurality of toothed pulleys 22 around which the endless toothed belts are wound, and a plurality of dough holding members 24 extending in a direction perpendicular to the direction in which dough is conveyed by the endless dough conveyor and supportably connected at both ends thereof to the endless toothed belts 18.

The endless toothed belts 18 and the toothed pulleys 22 are made of resin. The endless toothed belts are preferably made of urethane resin and provided inside thereof with a steel core wire extending in the longitudinal direction thereof. The toothed pulleys are preferably made of resin different from that used for the endless toothed belts. For example, nylon resin is suitable for the toothed pulleys. These kinds of resin are preferably anti-statically treated.

As shown in FIG. 1, the housing 14 has a base portion 14-1 disposed on a floor F, and a proofer portion 14-2 defining a proofer chamber 12. The endless dough conveyor 16 extends upwardly in the base portion 14-1 and horizontally in plural layers (six layers in the illustrated example) in the vertical direction. The endless dough conveyor 16 receives dough supplied through a chute 23 at the bottom portion of the base portion 14-1, conveys the dough upwardly and into the proofer chamber 12, and then discharges the dough to a discharge chute 25. As shown in FIGS. 1 and 2, in the endless dough conveyor 16, two pairs of toothed pulleys 22 positioned at the upper and lower portions at the left end (as viewed in the figure) of the horizontally extending portion of the endless dough conveyor are each drivingly connected to an output shaft of a respective induction motor 34 by means of drive belts 32 provided for each toothed pulley. Each of the induction motors 34 is supplied with and driven by an identical voltage at an identical frequency from an inverter 35. Even if loads on the induction motors are different from each other, the induction motors eliminate the difference to operate synchronously with each other.

FIGS. 3 to 5 show the relationship among the housing 14, the endless toothed belt 18, and the dough holding member 24, at one end portion in the transverse direction of the horizontally extending portion of the endless dough conveyor 16. FIG. 6 shows the relationship between the endless toothed belt 18 and a connecting member 54 for connecting the dough holding member 24 to the endless toothed belt 18.

As shown in FIGS. 3 and 5, the dough holding member 24 has a frame 38 having a rectangular shape in a plan view, and the frame 38 is provided with a plurality of dough trays (baskets) 26.

The endless toothed belt 18 is provided with a through hole 42 extending across the endless toothed belt so as to correspond to each dough holding member 24 (see FIGS. 6 and 5). A shaft 44 having a roller 46 rotatably attached thereto is inserted into and secured to the through hole. Specifically, the shaft 44 has a small-diameter portion 47 which is inserted into the through hole 42, and a large-diameter portion 48 which rotatably holds the roller 46. A nut 50 is screwed onto the distal end of the small-diameter portion 47 projecting outwardly from the through hole 42, whereby the shaft 44 is secured to the endless toothed belt 18. The shaft 44 is provided with a support hole 52 extending from the right end thereof to the left coaxially with the shaft.

Between the shaft 44 and the frame 38 of the dough holding member, a connecting member 54 is provided for connecting the shaft and the frame. As shown in FIGS. 3 to 5, the connecting member 54 has a trapezoidal-shaped portion 56 (see FIG. 3) secured to a side end surface of the frame 38, a tubular portion 58 extending from the upper central portion of the trapezoidal-shaped portion 56 toward the endless toothed belt 18, and a connecting pin 60 slidably disposed in the tubular portion 58. The left end portion of the connecting pin 60 is inserted into the support hole 52 of the shaft 44, whereby the frame 38 of the dough holding member is pivotally attached to the shaft 44 (i.e., to the endless toothed belt).

In FIG. 4, reference numeral 62 denotes a frame forming the housing 14. The frame 62 is provided with a rail 64 disposed along a moving path of the roller 46 and attached to the frame 62 by means of the support bar 65. The rail 64 has a metal rail body 66, and a resin roller engaging portion 68 extending along and covering the upper end portion of the rail body 66. The roller 46 has at both ends thereof flanges 70, 70, each of which has an inclined surface extending mutually away from the surface of the roller 46. The roller engaging portion 68 has at both ends thereof inclined surfaces which engage with the inclined surfaces of the flanges, and a central surface parallel to the surface of the roller 46. Preferably, the central surface of the roller engaging portion 68 is adapted not to contact with the surface of the roller 46.

An assist rail 72 is disposed below the endless toothed belt 18 so as to extend along the endless toothed belt 18 by means of the support bar 65. In assembling the endless dough conveyor 16 in the proofer, the endless toothed belt 18 engages with and is supported by the assist rail 72 when the endless toothed belt 18 is wound around the toothed pulley 22 in a state in which the dough holding member 24 has not been connected to the endless toothed belt 18. Then, when the dough holding member 24 is connected to the endless toothed belt 18, the endless toothed belt 18 is moved upwardly from the assist rail 72. In FIG. 4, reference numeral 74 denotes a foreign matter tray.

In the toothed pulleys shown in FIG. 1, toothed pulleys 22-1 are take-up pulleys which are displaceable according to the tension of the endless toothed belt 18 wound around the take-up pulleys 22-1. Specifically, as shown in FIG. 7, the take-up pulley 22-1 is slidably attached to the housing 14 by means of a toothed pulley holding member 76, and is biased by a tension spring 78 in a direction in which the endless toothed belt 18 is applied to the tension (i.e., in the leftward direction in FIG. 7). The take-up pulley 22-1 is adapted to be displaced rightward when the tension of the endless toothed belt becomes larger. Reference numeral 80 denotes a proximity switch attached to the housing 14. If the holding member 76 of the take-up pulley is displaced rightward by excessive tension of the endless toothed belt 18, the proximity switch detects this displacement of the holding member 76 and generates a command signal necessary for stopping a motor and the like.

FIG. 8 shows an abnormality detecting unit 82 for the drive toothed pulley 22. The abnormality detecting unit 82 has a roller 84 which rotatably engages with the outer surface of the endless toothed belt 18 wound around the drive toothed pulley 22. In a case where the endless toothed belt disengages with the drive toothed pulley 22 and then teeth of the endless toothed belt climb onto that of the drive pulley, the abnormality detecting unit detects the displacement of the endless toothed belt and indicates occurrence of abnormality. For example, such abnormality occurs when the endless toothed belt 18 reaches the end of its useful life. Before the endless toothed belt 18 breaks at the end of its useful life, the endless toothed belt is plastically stretched at a certain portion which will be broken. In this state, the distance between adjacent teeth of the endless toothed belt at the certain portion becomes larger. Thus, teeth of the endless toothed belt disengages with that of the toothed pulley 22, which causes the teeth of the endless toothed belt to climb onto that of the drive pulley. Therefore, by detecting the above stated abnormality, it is possible to predict that the endless toothed belt is reaching the end of its useful life.

Alternatively, it is also possible to predict the end of useful life of the endless toothed belt by means of another detecting unit shown in FIG. 9. The housing 14 (i.e., the frame defining the housing) is provided with a lever 86 pivotally attached thereto. The lever 86 is provided at one end thereof with a detecting toothed roller 88 which engages with the endless toothed belt 18, and a proximity switch 90 is disposed adjacent to the other end of the lever 86. When the endless toothed belt 18 reaches the end of its useful life and is then plastically stretched, teeth of the detecting roller 88 disengage with that of the endless toothed belt 18, which causes the detecting roller 88 to be moved upwardly. Then, the proximity switch 90 detects this displacement.

It should be noted that the present invention is not necessarily limited to the foregoing embodiment but can be modified in a variety of ways without departing from the gist of the present invention.

What is claimed is:

1. A proofer comprising:
a proofer chamber; and,
an endless dough conveyor at least a part of which is disposed in the proofer chamber, the endless dough conveyor including:
a pair of resin endless toothed belts mutually spaced in the horizontal direction;
resin toothed pulleys around which the resin endless toothed belts are engaged;
dough holding members disposed between and successively arranged along the pair of endless toothed belts, the dough holding members extending perpendicularly to the direction in which dough is conveyed;
connecting members attached to the endless toothed belts for detachably connecting opposite ends of the respective dough holding members to the endless toothed belt;
resin rollers rotatably attached to the connecting members; and,
a pair of rails disposed along horizontal moving paths of the rollers which extend between the opposite ends of the dough holding members and the pair of resin endless toothed belts, respectively, for supporting the rollers moving along the horizontal moving paths;
wherein the rail includes a metal rail body, and a roller engaging member made of resin and attached to the rail body so as to support the roller;
the roller has at opposite ends thereof flanges each having an inclined surface, the inclined surfaces of the flanges extending in a diverging fashion from a surface of the roller; and,
the roller engaging member of the rail is configured to be engaged with the inclined surfaces of the flanges at a position away from the surface of the roller.

2. A proofer comprising:
a proofer chamber; and,
an endless dough conveyor at least a part of which is disposed in the proofer chamber, the endless dough conveyor including:
a pair of resin endless toothed belts mutually spaced in the horizontal direction;
resin toothed pulleys around which the resin endless toothed belts are engaged;
dough holding members disposed between and successively arranged along the pair of endless toothed belts, the dough holding members extending perpendicularly to the direction in which dough is conveyed;

connecting members attached to the endless toothed belts for detachably connecting opposite ends of the respective dough holding members to the endless toothed belt;

resin rollers rotatably attached to the connecting members; and, a pair of rails disposed along horizontal moving paths of the rollers which extend between the opposite ends of the dough holding members and the pair of resin endless toothed belts, respectively, for supporting the rollers moving along the horizontal moving paths;

the toothed pulleys are arranged to make a plurality of pairs of the toothed pulleys which are oppositely disposed on left and right sides of the endless dough conveyor and at least two pairs thereamong are for driving;

each pair of the at least two pairs of the toothed pulleys is drivingly connected to an induction motor; and, the induction motors are supplied with driving electric power from a single inverter.

3. A proofer comprising:

a proofer chamber; and, an endless dough conveyor at least a part of which is disposed in the proofer chamber, the endless dough conveyor including:

a pair of resin endless toothed belts mutually spaced in the horizontal direction;

resin toothed pulleys around which the resin endless toothed belts are engaged;

dough holding members disposed between and successively arranged along the pair of endless toothed belts, the dough holding members extending perpendicularly to the direction in which dough is conveyed;

connecting members attached to the endless toothed belts for detachably connecting opposite ends of the respective dough holding members to the endless toothed belt;

resin rollers rotatably attached to the connecting members; and, a pair of rails disposed along horizontal moving paths of the rollers which extend between the opposite ends of the dough holding members and the pair of resin endless toothed belts, respectively, for supporting the rollers moving along the horizontal moving paths;

the toothed pulleys are arranged to make a plurality of pairs of the toothed pulleys which are oppositely disposed on left and right sides of the endless dough conveyor and at least one pair thereamong is displaceable according to tension of the endless toothed belts ; and the proofer further comprises an abnormal tension detecting sensor for detecting and indicating occurrence of abnormal tension on the endless toothed belts when the displacement of the at least one pair of the toothed pulleys is larger than a predetermined value.

4. A proofer comprising:

a proofer chamber; and, an endless dough conveyor at least a part of which is disposed in the proofer chamber, the endless dough conveyor including:

a pair of resin endless toothed belts mutually spaced in the horizontal direction;

resin toothed pulleys around which the resin endless toothed belts are engaged;

dough holding members disposed between and successively arranged along the pair of endless toothed belts, the dough holding members extending perpendicularly to the direction in which dough is conveyed;

connecting members attached to the endless toothed belts for detachably connecting opposite ends of the respective dough holding members to the endless toothed belt;

resin rollers rotatably attached to the connecting members; and, a pair of rails disposed along horizontal moving paths of the rollers which extend between the opposite ends of the dough holding members and the pair of resin endless toothed belts, respectively, for supporting the rollers moving along the horizontal moving paths;

the proofer further comprising a detecting switch for detecting a risk of breakage of the endless toothed belt, wherein if teeth of the endless toothed belt disengage with and climb onto that of the toothed pulley, the detecting switch detects this displacement of the endless toothed belt and indicates a risk of breakage of the endless toothed belt.

* * * * *

UNITED STATES PATENT AND TRADEMARK OFFICE
CERTIFICATE OF CORRECTION

PATENT NO.        : 7,789,222 B2
APPLICATION NO.   : 12/030427
DATED             : September 7, 2010
INVENTOR(S)       : Kazuhide Fujita et al.

It is certified that error appears in the above-identified patent and that said Letters Patent is hereby corrected as shown below:

On the Title Page

Item (75), replace "Fujisawa" with --Fujisawa-shi-- (all three occurrences).

Item (75), after "Satoshi Goto," replace "Kanagawa-ken" with --Fujisawa-shi--.

Item (73), after "Machinery Ltd.," replace "Tokyo" with -- Fujisawa-shi--.

Signed and Sealed this

Sixteenth Day of November, 2010

David J. Kappos
*Director of the United States Patent and Trademark Office*